US 6,690,876 B2

(12) United States Patent
Sigalas

(10) Patent No.: US 6,690,876 B2
(45) Date of Patent: Feb. 10, 2004

(54) THREE-DIMENSIONAL PHOTONIC CRYSTAL WAVEGUIDE APPARATUS

(75) Inventor: Mihail Sigalas, Santa Clara, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 246 days.

(21) Appl. No.: 09/893,380

(22) Filed: Jun. 27, 2001

(65) Prior Publication Data

US 2003/0002846 A1 Jan. 2, 2003

(51) Int. Cl.⁷ .................................................. G02B 6/10
(52) U.S. Cl. ...................................................... 385/146
(58) Field of Search ................................. 385/146, 131, 385/132, 14, 39, 40, 41, 42, 46, 47, 122, 125

(56) References Cited

U.S. PATENT DOCUMENTS

| 5,335,240 A | 8/1994 | Ho et al. ....................... 372/39 |
| 5,406,573 A | 4/1995 | Ozbay et al. .................. 372/43 |
| 6,542,682 B2 * | 4/2003 | Cotteverte et al. ........... 385/125 |

OTHER PUBLICATIONS

John D. Joannopoulos et al.; Book entitled Photonic Crystals by Princeton University Press—Section 1—Molding the Flow of Light—pp. 1–7 and Section 6—Three–Dimensional Photonic Crystals—pp. 78–93, no date.
K. M. Ho et al.; Photonic Band Gaps in Three Dimensions: New Layer–by–Layer Periodic Structures; Solid State Communications, vol. 89, No. 5; 1994; pp. 413–416.
Loncar, et al., "Waveguiding in Planar Photonic Crystals," Applied Physics Letters, vol. 77, No. 13, Sep. 25, 2000, pp. 1937–1939.
Bayindir et al., "Guiding, Bending, and Splitting of Electromagnetic Waves in Highly Confined Photonic Crystal Waveguides," The American Physical Society, 081107(R), Feb. 7, 2001, pp. 63–081107–1–081107–4.
Sigalas et al., "Waveguide Bends in three–Dimensional Layer–By–Layer Photonic Bandgap Materials," Microwave and Optical Technology letters, vol. 23, No. 1, Oct. 5, 1999, pp. 56–59.

* cited by examiner

Primary Examiner—Javaid H. Nasri

(57) ABSTRACT

A three-dimensional photonic crystal waveguide apparatus has a three-dimensional photonic crystal, the three-dimensional photonic crystal having a plurality of layers arranged one above another, each of the plurality of layers having a plurality of elements that are parallel to and spaced from one another, the plurality of elements in each layer arranged at an angle other than zero with respect to the plurality of elements in an adjacent layer. The three-dimensional photonic crystal also has a waveguide therein comprising a first region of defects in a segment of an element in one layer of the plurality of layers and having a light input, and a second region of defects in at least a segment of an element in an adjacent layer of the plurality of layers and having two light outputs, the first and second region of defects intersecting to provide an optical splitter that extends from the one layer to the adjacent layer. The waveguide can be configured to guide light through the apparatus along substantially any desired path to connect different devices in a compact optical or optoelectronic integrated circuit.

20 Claims, 5 Drawing Sheets

THREE-DIMENSIONAL PHOTONIC CRYSTAL WAVEGUIDE APPARATUS

BACKGROUND OF THE INVENTION

1. Technical Field of the Invention

The present invention relates generally to the field of photonic crystals; and, more particularly, to a three-dimensional photonic crystal waveguide apparatus.

2. Description of Related Art

Photonic crystals are periodic dielectric structures that can prohibit the propagation of light in certain frequency ranges (see J. D. Joannopoulos, R. D. Meade, and J. N. Winn, *Photonic Crystals*, Princeton University Press, Princeton, N.J., 1995). In particular, photonic crystals have spatially periodic variations in refractive index; and with a sufficiently high refractive index contrast, photonic bandgaps can be opened in the structure's optical spectrum. The term "photonic bandgap" as used herein and as used in the art is a frequency range within which the propagation of light through the photonic crystal is prevented. In addition, the term "light" as used herein is intended to include radiation throughout the electromagnetic spectrum, and is not limited to visible light.

It is known that introducing defects in the periodic structure of a photonic crystal allows the existence of localized electromagnetic states that are trapped at the defect site, and that have resonant frequencies within the bandgap of the surrounding photonic crystal material. By providing a region of defects extending through the photonic crystal, a waveguide structure can be created and used to control and guide light.

A two-dimensional photonic crystal slab waveguide apparatus may comprise a two-dimensional periodic lattice in the form of an array of posts incorporated in a slab body and having upper and lower cladding layers. The posts can, for example, comprise holes in a slab body of dielectric material, or the posts can comprise dielectric rods and the slab body can be air, another gas or a vacuum. In addition, the posts can comprise rods of a dielectric material having a first refractive index and the slab body can comprise a dielectric material having a second refractive index different from the first refractive index. One example of a two-dimensional photonic crystal slab waveguide apparatus comprises a photonic crystal having a periodic arrangement of posts in the form of air holes arranged in and extending through a dielectric slab body, and a waveguide comprising a region of defects in the photonic crystal formed by omitting some of the air holes (see M. Loncar, et al., Appl. Phys. Lett., 77, 1937, 2000).

In a two-dimensional photonic crystal slab waveguide apparatus, light propagating in the slab is confined in the direction perpendicular to a major surface of the slab via total internal reflection. Light propagation in other directions is controlled by the properties of the photonic crystal slab. Two-dimensional photonic crystal slab waveguide apparatus are able to guide light in a plane of the apparatus (i.e., in a plane parallel to a major surface of the photonic crystal slab; but are not able to guide light in paths which extend in three dimensions. In other words, planar waveguide devices are known for guiding optical signals in two dimensions. In some applications of optical data manipulation it is desirable to move guide optical signals in three dimensions. Therefore, what is needed is a an apparatus for directing and controlling optical signals in more than two dimensions.

SUMMARY OF THE INVENTION

The present invention provides a three-dimensional photonic crystal waveguide apparatus that has a three-dimensional photonic crystal. The three-dimensional photonic crystal comprises a plurality of layers arranged one above another, each of the plurality of layers comprising a plurality of elements that are parallel to and spaced from one another. The plurality of elements in each layer are arranged at an angle greater than zero degrees with respect to the plurality of elements in an adjacent layer. The three-dimensional photonic crystal further has an optical waveguide therein that is capable of transmitting light having a frequency within a bandgap of the three-dimensional photonic crystal, the waveguide comprising a first region of defects in a segment of an element in one of the plurality of layers, the first region of defects having a light input, and a second region of defects in at least a segment of an element in an adjacent layer of the plurality of layers, the second region of defects having two light outputs, the first region of defects and the second region of defects intersecting to provide an optical splitter that extends from the one layer to the adjacent layer.

According to an embodiment of the present invention, the first region of defects is created by omitting a segment of an element in the one layer, and the second region of defects is created by omitting at least a segment of an element in the adjacent layer. By omitting elements and/or segments of elements in a selected plurality of layers, a waveguide can be configured that incorporates an optical splitter and that extends from any one of the plurality of layers to any other of the plurality of layers.

According to a further embodiment of the invention, the light input comprises a light input port in the three-dimensional photonic crystal, the second region of defects is created by omitting an entire element in the adjacent layer and the two light outputs comprise two output ports in the three-dimensional photonic crystal to provide an optical splitter having an input port in the one layer and two output ports in the adjacent layer.

According to further embodiments of the invention, the plurality of elements in each layer comprise a plurality of dielectric rods, and the plurality of rods in one layer are arranged perpendicular to the plurality of rods in adjacent layers; and, in addition, the plurality of rods in every other layer are laterally displaced with respect to one another.

A three-dimensional photonic crystal waveguide apparatus according to embodiments of the present invention provides a fully three-dimensional photonic bandgap. Accordingly, total internal reflection is not needed to confine the light. Instead, the light is confined in the low dielectric region of the photonic crystal (e.g., in air) such that the effects of internal losses and dispersion of the high refractive index medium (i.e., the elements) are not so important.

In general, in a three-dimensional photonic crystal waveguide apparatus of the present invention, a waveguide having one or more splitters and which may additionally include one or more bends can be configured to guide light through the apparatus along substantially any desired path with substantially zero loss. With an apparatus in accordance with the present invention, waveguides can be configured to connect different devices in a tightly integrated and compact optical or optoelectronic integrated circuit.

Yet further advantages, specific details and other embodiments of the present invention will become apparent hereinafter in conjunction with the following detailed description of exemplary embodiments of the invention.

DETAILED DESCRIPTION OF THE EXEMPLARY EMBODIMENTS OF THE INVENTION

Figure 1:
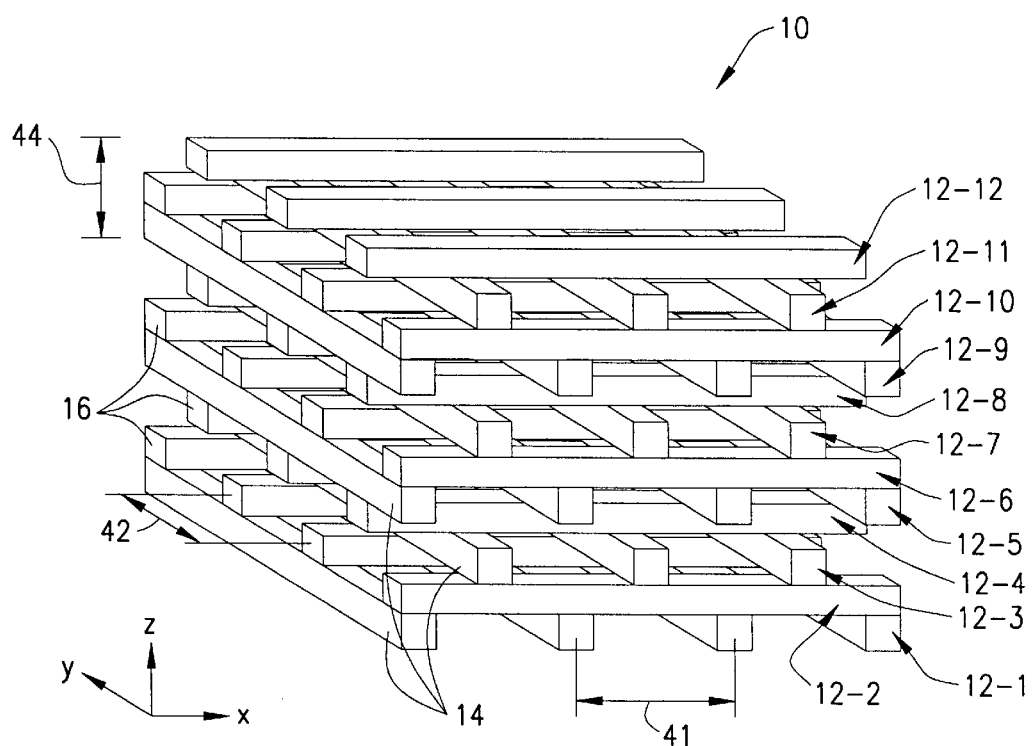
FIG. 1 is a schematic, perspective view illustrating a three-dimensional photonic crystal apparatus that is known in the prior art to assist in explaining the present invention.

Three-dimensional photonic crystal waveguide apparatus are known in the art. In particular, FIG. 1 is a schematic, perspective view of a known three-dimensional photonic crystal apparatus (see K. M. Ho, et al., Solid State Commun., 89,413,1994 and U.S. Pat. Nos. 5,335,240 and 5,406,573) that may include an optical waveguide therein, and that is described herein to assist in explaining the present invention. The apparatus is generally designated by reference number 10 and comprises a three-dimensional photonic crystal composed of a plurality a layers arranged one on top of another. In FIG. 1, three-dimensional photonic crystal apparatus 10 comprises twelve layers 12-1 to 12-12. although the apparatus can comprise any desired plurality of layers.

Each layer 12-1 to 12-12 comprises a plurality of elements arranged to be parallel to and equally spaced from one another. In addition, the plurality of elements in each layer are arranged perpendicular to the elements in an adjacent layer.

In FIG. 1, the elements comprise rods, and layers 12-1, 12-3, 12-5, 12-7, 12-9 and 12-11 each comprise a plurality of rods 14 arranged in a direction parallel to the y-axis of the apparatus (as shown in FIG. 1); and layers 12-2, 12-4, 12-6, 12-8, 12-10 and 12-12 each comprise a plurality of rods 16 arranged in a direction parallel to the x-axis of the apparatus. In addition, as shown in FIG. 1, in every other layer, the rods are laterally displaced with respect to one another by an amount equal to one-half the spacing between the rods in a layer. Specifically, in FIG. 1, the rods in layers 12-3, 12-7 and 12-11 are aligned with respect to one another along the x-axis, but are laterally displaced, along the x-axis, from the plurality of rods in layers 12-1, 12-5 and 12-9. Also, the rods in layers 12-2, 12-6 and 12-10 are aligned with respect to one another along the y-axis, but are laterally displaced, along the y-axis, from the plurality of rods in layers 12-4, 12-8 and 12-12.

The three-dimensional photonic crystal apparatus of FIG. 1, can be described as comprising a photonic crystal having a three-dimensional array of unit cells therein in which a "unit cell" is defined as a cell having dimensions in the x and y directions equal to the spacing between the rods in the layers, i.e., the dimensions 41 and 42 in FIG. 1; and a dimension in the z-direction equal to the thickness of four layers, i.e., the dimension 44 in FIG. 1.

In the three-dimensional photonic crystal illustrated in FIG. 1, rods 14 and 16 comprise dielectric rods of a material having a high dielectric constant, e.g., silicon, surrounded by a material having a low dielectric constant, e.g., air.

The three-dimensional photonic crystal apparatus of FIG. 1 has spatial periodicity in three dimensions and provides a fully three-dimensional photonic bandgap. By introducing a region of defects in the photonic crystal, an optical waveguide can be created through which light having a frequency within the photonic crystal's bandgap is able to propagate. The region of defects can be arranged to extend through the three-dimensional photonic crystal in each of the x, y and z directions of the photonic crystal to provide a photonic crystal waveguide apparatus capable of guiding light in three dimensions.

Figure 2:
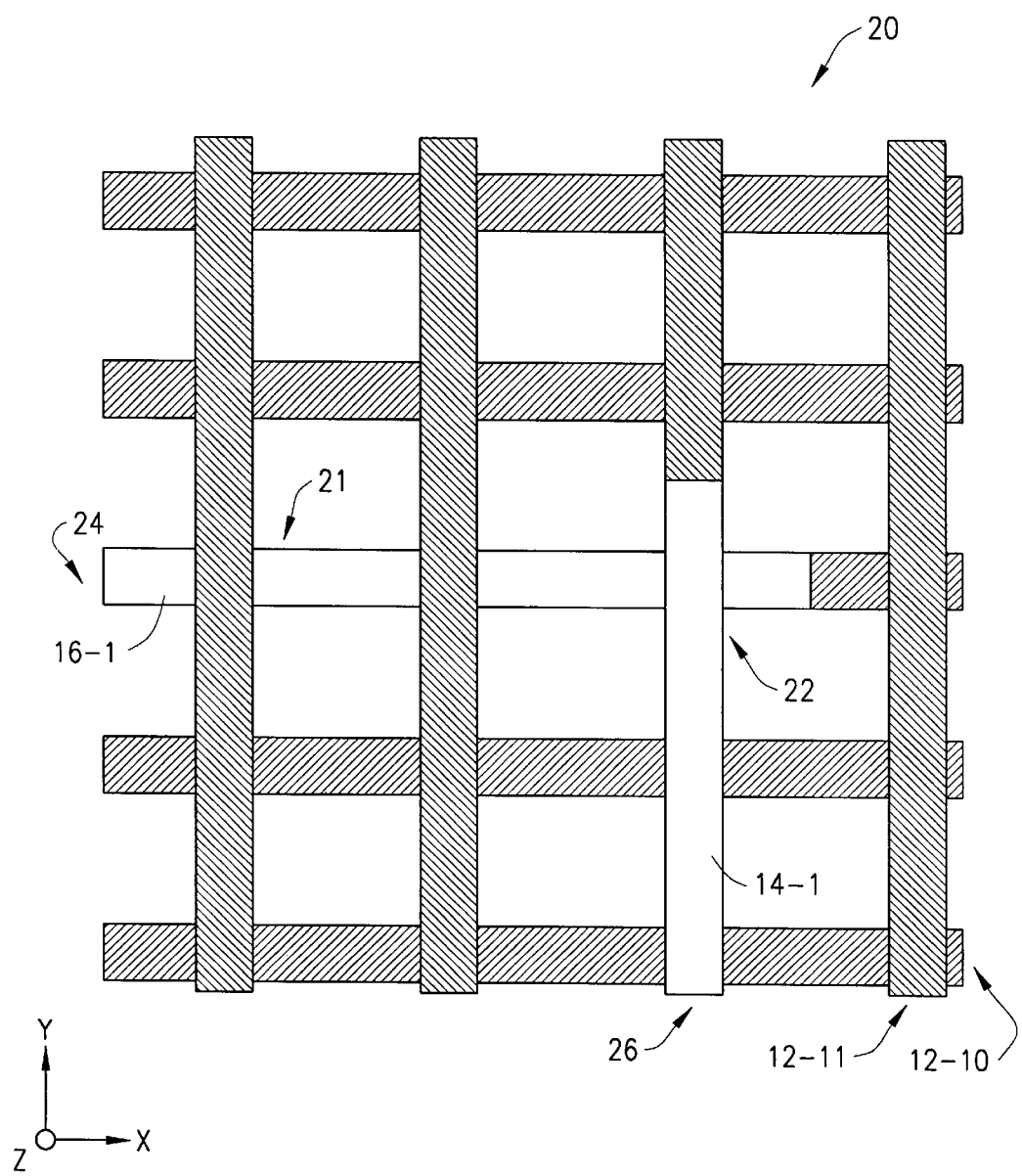
FIG. 2 is a projection view, in the xy plane, of a tenth and an eleventh layer of a three-dimensional photonic crystal waveguide apparatus that is known in the prior art.

FIG. 2 is a projection view, in the xy plane, of the tenth and eleventh layers of the three-dimensional photonic crystal apparatus of FIG. 1 to illustrate an optical waveguide therein that is bent at a 90 degree angle (see M. M. Sigalas, et al., *Waveguide Bands in Three-Dimensional Layer-by-Layer Photonic Bandgap Materials,* Microwave Opt. Technol. Lett. 23, 56, 1999). The apparatus of FIG. 2 is generally designated by reference number 20, and includes a waveguide 21 therein bent at an angle of 90 degrees and capable of transmitting light having a frequency in a bandgap of the three-dimensional photonic crystal of the apparatus. Waveguide 21 comprises a region of defects in the three-dimensional photonic crystal that is created by omitting a segment of a rod 16-1 from the tenth layer, i.e., layer 12-10, and a segment of a rod 14-1 from the eleventh layer, i.e., layer 12-11, of the photonic crystal such that the omitted segments of the two rods intersect at location 22 to define a waveguide which extends between layers 12-10 and 12-11 at location 22. As shown in FIG. 2, waveguide 21 also has a 90 degree bend at location 22, a first port 24 in layer 12-10 and a second port 26 in layer 12-11. If port 24 comprises an input port and port 26 comprises an output port, light entering the waveguide at port 24 will exit the waveguide at port 26 after being turned through 90 degrees and after being guided in the plus z-direction from layer 1210 to layer 12-11, by the thickness of one layer. Alternatively, if port 26 is the input port and port 24 is the output port, light entering the waveguide 21 at input port 26 will be turned by 90 degrees at location 22 and be guided in the minus z-direction from layer 12-11 to layer 1210.

Figure 3:
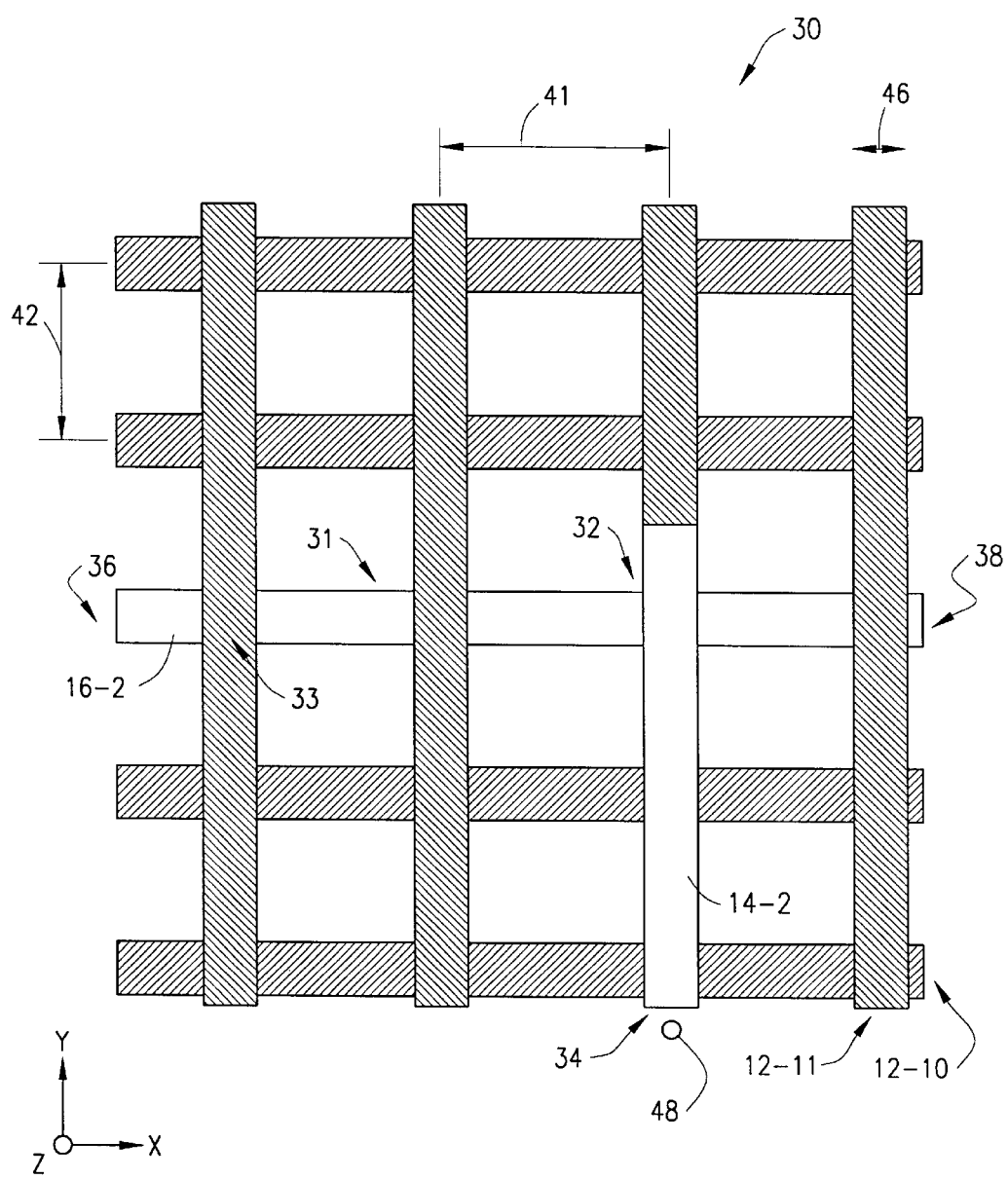
FIG. 3 is a projection view, in the xy plane, of the tenth and eleventh layers of a three-dimensional photonic crystal waveguide apparatus according to an embodiment of the present invention.

FIG. 3 is a projection view, in the xy plane, of the tenth and eleventh layers of a three-dimensional photonic crystal waveguide apparatus 30 according to an embodiment of the present invention. Apparatus 30 may be similar to the three-dimensional photonic crystal apparatus 10 of FIG. 1, and includes a region of defects therein to define a waveguide 31. More particularly, waveguide 31 includes a first region of defects created by omitting one complete rod 16-2 in the tenth layer (i.e., layer 12-10), and a second region of defects created by omitting a segment of one rod 14-2 in the eleventh layer (i.e., layer 12-11) such that the first and second defect regions intersect at location 32. It should be understood, however, that the first and second regions of defects can also be created in other ways, for example, by changing the size of the elements or by omitting segments in more than one element in each layer; and it is not intended to restrict the invention to any particular manner of creating the defect regions.

In the embodiment illustrated in FIG. 3, the waveguide 31 has one input port 34 and two output ports 36 and 38. Light entering the waveguide at input port 34 is split at location 32 and the split light exits the waveguide at ports 36 and 38. In addition, the light is guided in the minus z direction from layer 12-11 to layer 12-10; and, thus, is offset in the minus z direction by the thickness of one layer.

In order to establish the effectiveness of a three-dimensional photonic crystal waveguide apparatus of the present invention, fields were calculated using the Finite Difference Time Domain (FDTD) method (see a. Taflove, *Finite Difference Time Domain Method*). In the calculated system, a three-dimensional photonic crystal waveguide apparatus was constructed as illustrated in FIG. 3. The constructed apparatus comprised a photonic crystal consisting of 9×9×5 unit cells along the x, y and z directions, respectfully. Each unit cell had dimensions in the x and y directions equal to the spacing between the rods in the layers, i.e., the dimensions 41 and 42 in FIGS. 1 and 3; and a dimension in the z direction equal to the thickness of four layers, i.e., the dimension 44 in FIG. 1. Thus, the constructed apparatus consisted of 20 layers with each layer consisting of 10 rods. In the calculated system also, the rods had a dielectric constant of 12.96. The separation between the rods within each layer (i.e., the dimensions 41 and 42 of each cell) was 2.5 mm. The rods had a square cross-section with a width of 0.666 mm (illustrated by arrow 46 in FIG. 3). The dimension of each cell in the z direction, accordingly, was 4×0.666 or 2.664 mm.

A waveguide was created in the three-dimensional photonic crystal of the calculated apparatus by omitting one rod from the tenth layer and a segment of a rod from the adjacent eleventh layer to provide a splitter as shown in FIG. 3 having one input port 34 and two output ports 36 and 38. A dipole 48 was placed at the input port 34 as shown in FIG. 3, and, in the calculated system, created a continuous excitation at a single frequency of 46 GHz, although it should be understood that this is intended to be an exemplary frequency only.

Figure 4:
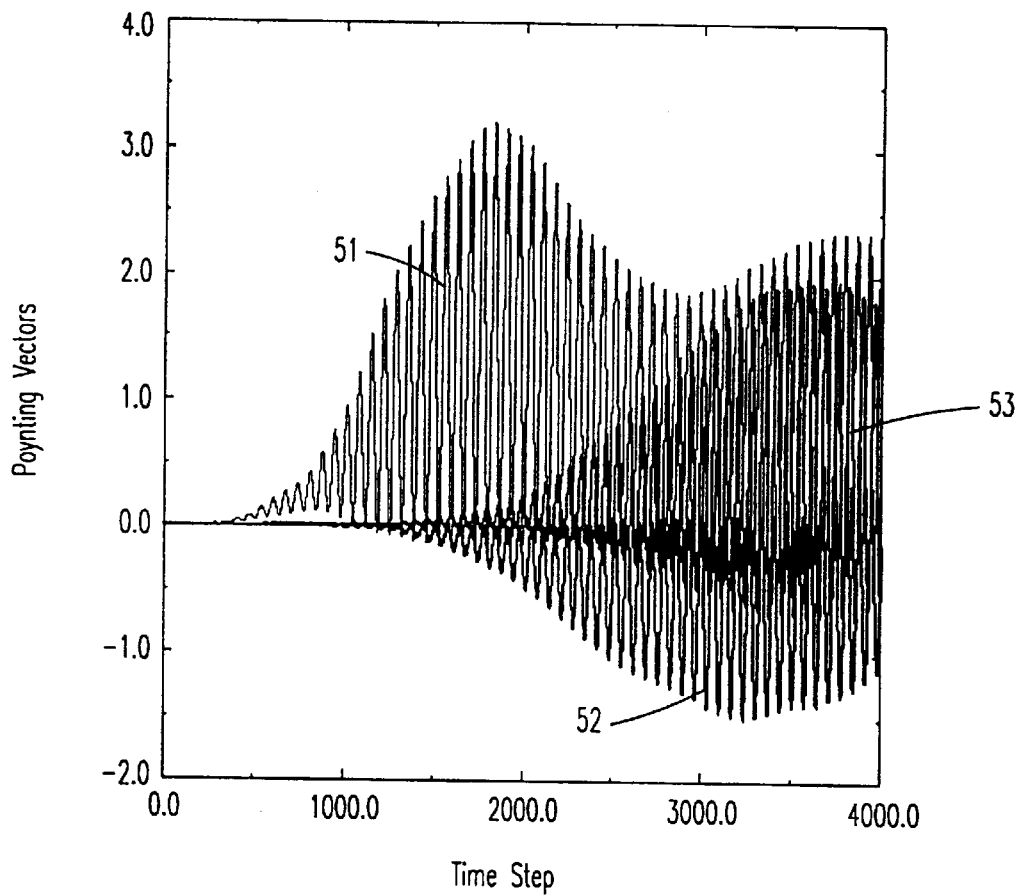
FIG. 4 illustrates the Poynting vectors two unit cells away from the intersection of omitted portions of elements in the tenth and eleventh layers of the optical waveguide apparatus of FIG. 3 in the directions of ports in the optical waveguide apparatus.

FIG. 4 illustrates the Poynting vectors 51, 52 and 53 at different time steps at a location two unit cells away from the intersection 32 of the omitted portions in the two layers 12-10 and 12-11 (in the x or y direction) in the directions of ports 34, 36 and 38, respectively, for example, at location 33 in FIG. 3, in the calculated system. As shown, the maximum of the Poynting vector at ports 34, 36 and 38 were 3.2, 1.47 and 1.89, respectively (the negative values at port 36 is related to the propagation direction). Due to the finite size of the photonic crystal, there are reflections from the ends of the waveguide which create standing waves within the waveguide. Also, because the lengths of the waveguide portions exiting at ports 36 and 38 were not equal, the distribution of the power was not equal. From calculations, it appears that 45% and 55% of the input power went to ports 36 and 38, respectively.

Figure 5:
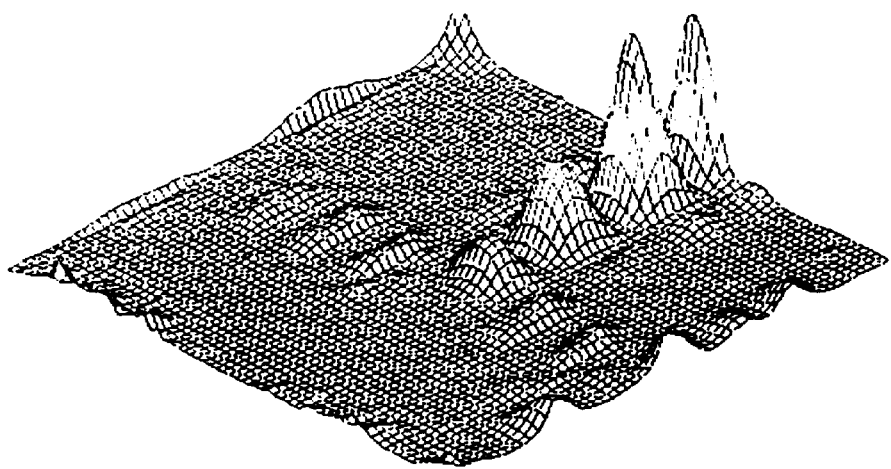
FIGS. 5 and 6 illustrate the distribution of the fields in the middle of the tenth and eleventh layers, respectively, in the optical waveguide apparatus of FIG. 3.
Figure 6:
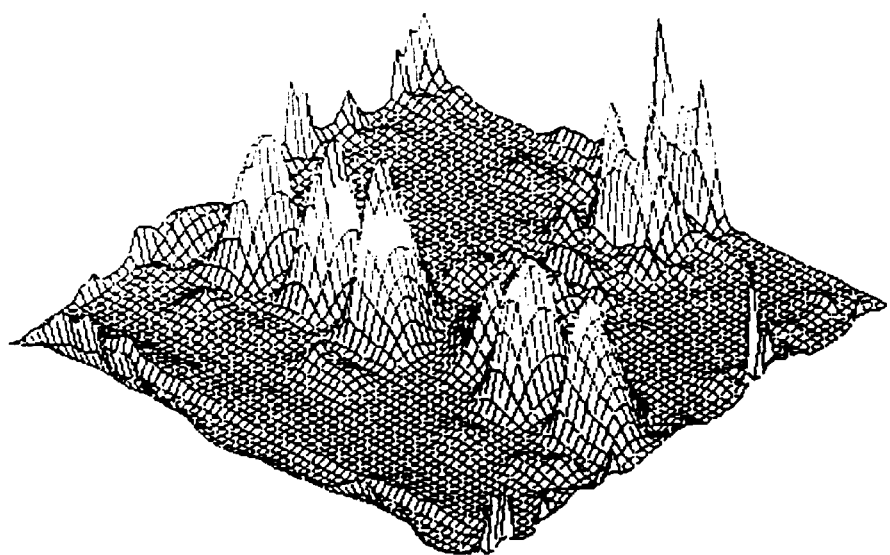

FIGS. 5 and 6 illustrate the distribution of the fields in the middle of layers 12-10 and 12-11, respectively, in the calculated system. As shown in the FIGS. 5 and 6, the fields were concentrated around the omitted dielectric rod portions such that they were mostly concentrated at the locations of the omitted rod segments. Accordingly, any problems related to material internal losses and non-linearities were eliminated.

The three-dimensional photonic crystal waveguide apparatus illustrated in FIG. 3 is intended to be only one example of the numerous ways that an optical waveguide can be configured. In alternative embodiments, a waveguide may be configured to include one or more splitters; and may additionally include one or more bends, such as 90 degree bends, arranged in any desired manner within the three-dimensional photonic crystal of the apparatus. An exemplary waveguide can also be configured to propagate light in the plus or minus z-directions of the apparatus from any one layer of the photonic crystal to any other layer of the photonic crystal through as many layers as desired. Furthermore, the light can be propagated within the apparatus along any desired path with substantially zero loss.

A three-dimensional photonic crystal waveguide apparatus according to the present invention can be used to connect different devices in an integrated circuit Since any splitters and bends in the waveguide are of the order of the wavelength of the light, the integrated circuit can be tightly integrated and quite compact; and, thus, the apparatus is particularly useful in the design of very small optical or optoelectronic integrated circuits.

A three-dimensional photonic crystal waveguide apparatus according to the present invention may also provide a fully three-dimensional bandgap; and, therefore, total internal reflection is not needed to confine the light. The light is confined in the low dielectric region (e.g., the air) resulting in that the effects of internal losses and dispersion of the high refractive index medium (the rods) are not so important.

While what has been described herein comprises exemplary embodiments of the invention, it should be recognized that the invention can be varied in numerous ways without departing therefrom. For example, although a photonic crystal waveguide apparatus having one waveguide has been described, the apparatus may have more than one waveguide for propagating light through the apparatus along different paths. Because the invention can be varied in numerous ways, it should be understood that the invention should be limited only insofar as is required by the scope of the following claims.

What is claimed:

1. A three-dimensional photonic crystal waveguide apparatus comprising:

a three-dimensional photonic crystal, said three-dimensional photonic crystal comprising a plurality of layers arranged one above another, each of the plurality of layers comprising a plurality of elements that are parallel to and spaced from one another, the plurality of elements in each layer arranged at an angle greater that zero with respect to the plurality of elements in an adjacent layer; and a waveguide in said three-dimensional photonic crystal that is capable of transmitting light having a frequency within a bandgap of said three-dimensional photonic crystal, said waveguide comprising a first region of defects in a segment of an element in a first layer of said plurality of layers and having a light input, and a second region of defects in at least a segment of an element in a second layer of said plurality of layers and having two light outputs, the first region of defects and the second region of defects intersecting to provide an optical splitter that extends from said first layer to said second layer.

2. The three-dimensional photonic crystal waveguide apparatus according to claim 1, wherein said light input of said first region of defects comprises a light input port in said three-dimensional photonic crystal.

3. The three-dimensional photonic crystal waveguide apparatus according to claim 2, wherein said second region of defects is in an entire element in said second layer, and wherein said two light outputs comprise two light output ports in said three-dimensional photonic crystal.

4. The three-dimensional photonic crystal waveguide apparatus according to claim 1, wherein said first region of defects is created by omitting a segment of an element in said first layer, and said second region of defects is created by omitting at least a segment of an element in said second layer.

5. The three-dimensional photonic crystal waveguide apparatus according to claim 4, wherein said second region of defects is created by omitting an entire element in said second layer.

6. The three-dimensional photonic crystal waveguide apparatus according to claim 1, wherein said plurality of elements in each of said plurality of layers comprise dielectric rods.

7. The three-dimensional photonic crystal waveguide apparatus according to claim 1, wherein the plurality of elements in each layer are arranged perpendicular to the plurality of elements in an adjacent layer.

8. The three-dimensional photonic crystal waveguide apparatus according to claim 1, wherein the plurality of elements in every other layer of said plurality of layers are laterally displaced with respect to one another.

9. The three-dimensional photonic crystal waveguide apparatus according to claim 8, wherein the plurality of elements in every other layer of said plurality of layers are laterally displaced by a distance equal to one-half a spacing between adjacent elements in a layer.

10. The three-dimensional photonic crystal waveguide apparatus according to claim 1, wherein said waveguide further includes at least one bend therein.

11. The three-dimensional photonic crystal waveguide apparatus according to claim 10, wherein said at least one bend comprises at least one 90-degree bend.

12. The three-dimensional photonic crystal waveguide apparatus according to claim 1, wherein said first layer comprises any one layer of said plurality of layers and said second layer comprises any other layer of said plurality of layers.

13. A three-dimensional photonic crystal waveguide apparatus comprising:
   a three-dimensional photonic crystal, said three dimensional photonic crystal comprising a plurality of layers arranged one above another, each of the plurality of layers comprising a plurality of elements that are parallel to and spaced from one another, the plurality of elements in each layer arranged at an angle greater that zero with respect to the plurality of elements in an adjacent layer; and
   a waveguide in said three-dimensional photonic crystal that is capable of transmitting light having a frequency within a bandgap of said three-dimensional photonic crystal, said waveguide comprising an omitted segment of an element in a first layer of said plurality of layers and having a light input, and at least an omitted segment of an element in a second layer of said plurality of layers and having two light outputs, said omitted segment of said element in said first layer and said at least an omitted segment of said element in said second layer intersecting to provide an optical splitter that extends from said layer to said second layer.

14. The three-dimensional photonic crystal waveguide apparatus according to claim 13, wherein said at least an omitted segment of said element in said second layer comprises an omitted element in said second layer.

15. The three-dimensional photonic crystal waveguide apparatus according to claim 14, wherein said light input comprises a light input port in said three-dimensional photonic crystal and said two light outputs comprise two light output ports in said three-dimensional photonic crystal.

16. The three-dimensional photonic crystal waveguide apparatus according to claim 13, wherein said waveguide further includes at least one bend therein.

17. The three-dimensional photonic crystal waveguide apparatus according to claim 13, wherein said first layer comprises any one of said plurality of layers and said second layer comprises any other of said plurality of layers.

18. The three-dimensional photonic crystal waveguide apparatus according to claim 13, wherein said plurality of elements in each of said plurality of layers comprise a plurality of dielectric rods.

19. The three-dimensional photonic crystal waveguide apparatus according to claim 1, wherein said first layer and said second layer comprise adjacent layers.

20. The three-dimensional photonic crystal waveguide apparatus according to claim 13, wherein said first layer and said second layer comprise adjacent layers.

* * * * *